INVENTOR.
JAMES R. CAMPBELL
BY Thomas P. Mahoney
ATTORNEY 3,077,532
METHOD AND APPARATUS FOR FABRICATING HONEYCOMB CORE
James R. Campbell, 1504 Carmelita St., Laguna Beach, Calif.
Filed June 5, 1959, Ser. No. 818,289
13 Claims. (Cl. 219—82)

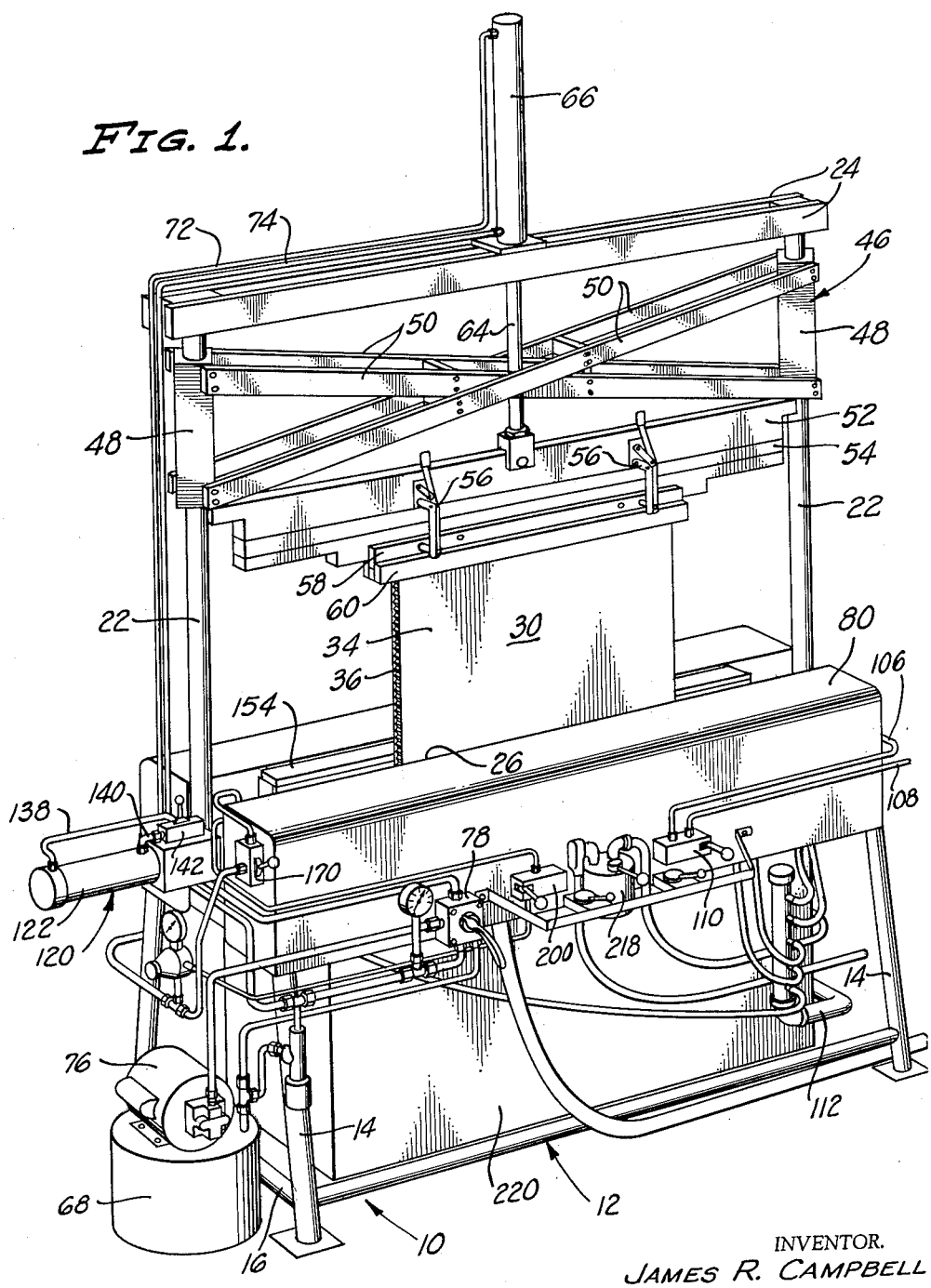

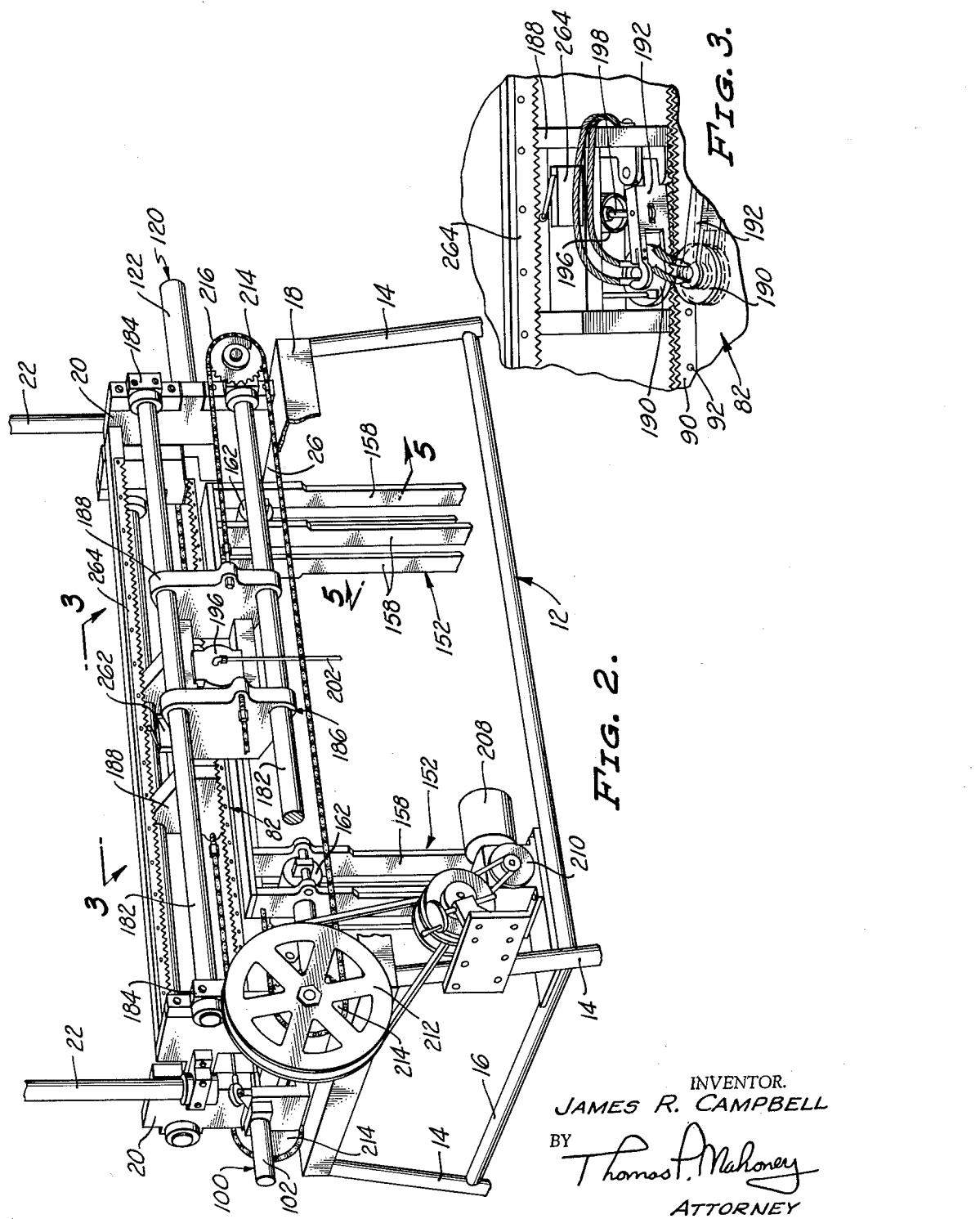

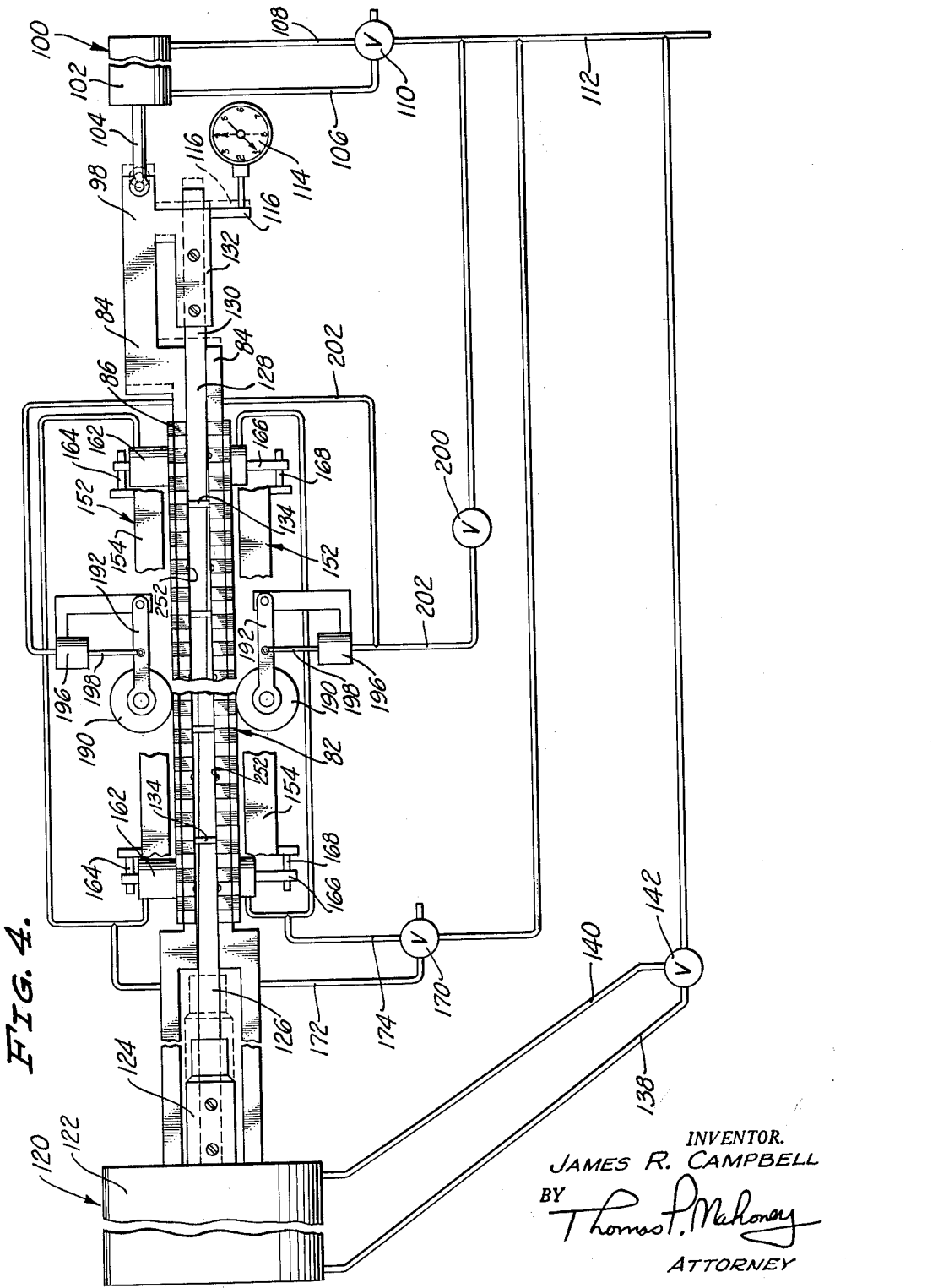

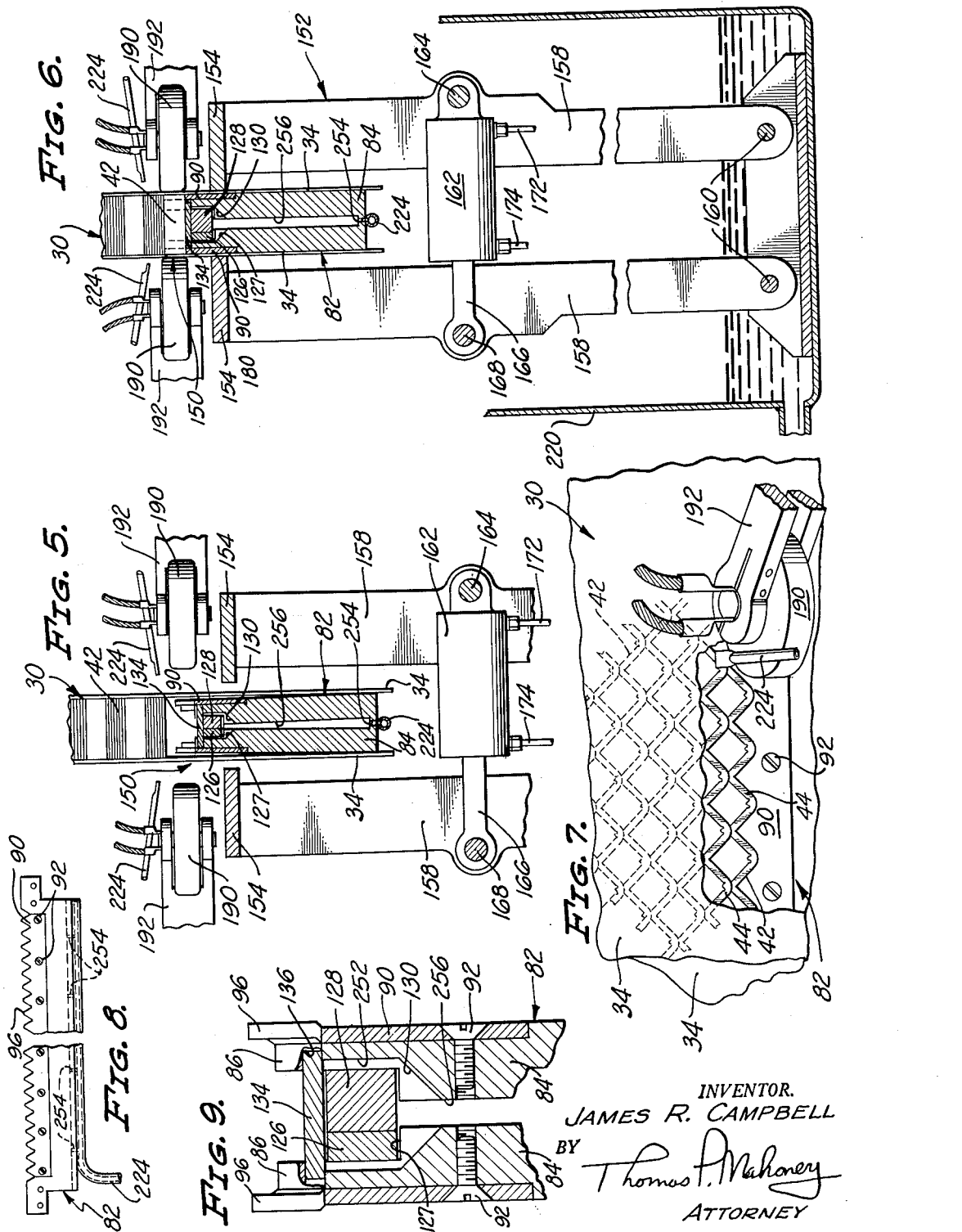

This invention relates to an apparatus and method for fabricating core reinforced panels and, more particularly, to a method of fabricating panel incorporating a core commonly known to those skilled in the art as honeycomb core.

It is well known to those skilled in the art that the demand of industry and the armed services for light-weight structural materials is steadily on the increase and that, so far as the armed services are concerned, the need for light-weight, heat resistant structures has been greatly accelerated by the high speeds attained in the flight of aircraft and various types of missiles. Thus, the need for a high-temperature resistant, high strength and relatively easily assembled structural panel has become more acute and it is an object of my invention to provide a method and apparatus for assembling such a panel.

A panel of the character whose method of assembly is disclosed herein is shown and described in my co-pending application, Serial No. 532,605, filed September 6, 1955, entitled "Structural Panel of Honeycomb Type," now Patent No. 2,910,153, issued Oct. 27, 1959.

Many attempts have been made in the past to fabricate honeycomb type core reinforced panels from various types of material. The cores have been fabricated from paper, aluminum foil, stainless steel foil, and the like, and the covering sheets have been fabricated from an equally wide variety of material. In assembling paper and aluminum foil cores, reliance has been had upon the use of various resin-type adhesives which are applied by spraying, laying on of resin-bearing tapes, or the like, to the interior surfaces of the sheets with which the core is to be associated and which are then applied over the opposite sides of the core to accomplish the bonding thereof under heat and pressure.

One of the major factors militating against the successful utilization of such resin-bonded panels wherein the opposite edges of the core are bonded to the interior surfaces of the sheets therefor by means of resinous adhesives is the fact that there is a considerable addition to the weight of the panel caused by the weight of the adhesive itself which, of course, must be spread across the entire surface of the sheet in order that a proper bond be obtained.

Moreover, in the assembly of conventional core structures formed from aluminum foil, or the like, by the use of resinous adhesives, it is necessary to first assemble the core element individually and then subsequently adhere the opposite edges of the core element to the interior surfaces of the adhesive coated sheets.

It is, therefore, an object of my invention to provide a method and apparatus for assembling a composite panel structure incorporating a honeycomb core wherein the elements of the honeycomb core and the surface sheets therefor can be secured in operative relationship with each other simultaneously, thus eliminating the necessity for prior assembly of the honeycomb core.

Attempts have also been made to provide structural panels incorporating honeycomb-type cores manufactured from stainless steel foil and covered with stainless steel sheets. In most instances, brazing has been the method utilized in causing the affixation of the cores in operative relationship with the stainless steel sheets and such conventional brazing techniques have necessitated the application of brazing materials in paste or other forms to the interior surfaces of the sheets of material to be affixed to the cores in a manner analogous to the application of resinous adhesives discussed hereinabove.

Naturally the utilization of such brazing materials or fluxes and the necessary application thereof across the interior surfaces of the sheets materially increases the entire weight of the assembly and also results in a bond between the opposite edges of the core and interiors of the sheets which is susceptible to high temperatures and corrosion, resulting in the ultimate separation of the sheets from operative relationship with the associated core. Since the brazing material must be applied in a layer thick enough to develop a fillet at the sharp edged abutment of the core edges to surface sheets, the weight thereof is a substantial component of the over-all weight of the ultimate panel.

Another object of my invention is the provision of a method and apparatus for fabricating a structural panel incorporating a honeycomb-type core wherein the necessity for the utilization of adhesives or bonding paste which must be spread across the entire interior surface of the associated covering sheets is eliminated and, therefore, considerable reduction in the weight of the resulting panel is achieved.

A further object of my invention is the provision of a method and apparatus for fabricating a structural panel incorporating a honeycomb-type core wherein the high temperature resisting qualities are limited only by the properties of the core and the surface sheet, and not by a bonding or brazing material interposed between said core and sheets.

In the method and apparatus of my invention, a core structure can be assembled by the simple expedient of inserting the flanges of a wave-formed core strip or element in operative relationship with the flanges of a similarly formed strip and securing the flanges in operative relationship with each other by means of welding, or the like. In the ensuing disclosure, the method and apparatus of my invention will be described as applied to the fabrication of stainless steel core material in association with stainless steel surface sheets, but it is, of course, readily apparent that the principles of my invention can be applied to the fabrication of various types of cores and panels from various types of materials and it is not intended that the scope of the invention be limited to the specific material utilized in either the core or the surface sheets therefor, nor to the weldment of the core and surface sheets in operative relationship.

An important result achieved by my invention is that by applying the means of securement of the core to the surface sheets to the opposite flanges of the core, it is possible to eliminate the need for coating the interior surfaces of said sheets. This is attributable to the fact that the flanges of the core strips or elements provide ample surface area for applying any type of adhesive material, if such adhesive material appears to be indicated by the desired use of the product, or provide, also, ample welding areas for the weldment of the core elements in operative association with each other and with surface sheets therefor.

Another object of my invention is the provision of an apparatus for forming a composite panel of the honeycomb core, reinforced type which includes means for supporting the surface sheets of such a panel in spaced relationship with each other, whereby the core strips or elements can be inserted in the space between the panels and said strips operatively connected to each other during the process of their being operatively connected to the surface sheets. Obviously, such an apparatus materially reduces the costly expenditure of time and labor entailed in the prior fabrication of the core stock before the application thereto of the surface sheets takes place.

An additional object of my invention is the provision of an apparatus of the aforementioned character whereby the core strips or elements and surface sheets can be welded in operative relationship with each other at a single pass of the welding head means incorporated therein without materially affecting the character of the core stock or the surface sheets therefor.

One of the major problems encountered in the resistance welding of honeycomb core of the aforementioned character to the associated surface sheets therefor has been the shrinkage problem. For instance, as the core strips or elements constituting the core are progressively welded to the interior surfaces of the surface sheets the longitudinal dimension of the panel is progressively reduced, causing the buckling or pleating of the surface sheets with the corresponding production of unacceptable irregularities in said surface sheets.

Obviously where the panel is intended for aerodynamic use such buckling or pleating cannot be tolerated since it would interfere with the aerodynamic characteristics of the aircraft or missile in which the panel was incorporated. Moreover the aforesaid pleating phenomenon frequently results in the creation of internal stresses and structural inequalities which prevent the panel from sustaining mechanical stresses to which it is subjected.

Another object of my invention is the provision of method and apparatus for fabricating honeycomb core reinforced panel which, in addition to permitting the simultaneous assembly and securement of said core and surface sheets, also permits the panel to be fabricated without the incorporation therein of the customary pleats or surface irregularities.

To accomplish the aforesaid desirable elimination of ripples or pleats in the surface sheets the steps of the method of my invention involve the location of a core strip or element between the surface sheets and the imposition of a compressive force on the outer surfaces of said sheets adjacent the welding zone during the welding step in order that the welding zone may be isolated from the remaining free portions of the surface sheets. Thus, there is provided a transitional area wherein the shrinkage of the panel during the welding process is controlled within acceptable limits and the characteristic pleating of the panel surface is eliminated.

Furthermore, I have discovered that the fabrication of panel incorporating core elements or strips having flanges on the opposite edges thereof is greatly facilitated when the apparatus of my invention incorporating isolation bars of a character to be described in greater detail hereinbelow is utilized.

Another object of my invention is the provision of an apparatus for fabricating honeycomb core reinforced panels which includes a plurality of isolation bars movable into engagement with the outer surfaces of the surface sheets in order that said surface sheets and the panel constituted by the same may be restrained against undue shrinkage during the welding process.

In addition, I have also ascertained that, when utilizing core elements of the character indicated hereinabove, it is desirable that the supporting bar or electrode therefor be provided with expansion means whereby the aforementioned flanges on said core element may be subjected to an expansive force to urge the flanges into more intimate engagement with the interior surfaces of the surface sheets to which they are juxtaposed.

A further object of my invention is the provision of a method wherein the flanges of the core strip or element are subjected to an expansive force during the welding process to insure optimum engagement between the flanges of the core strip or element and the interior surfaces of the surface sheets.

In the loading of a core strip on the supporting bar or electrode, it is obviously impossible to apply the core strip to the bar when the transverse dimension between the flanges of the core strip is equal to or less than the transverse dimension of the electrode which is a desirable condition for good welding and for preventing core deformation due to welding forces during the welding operation.

Therefore, a further object of my invention is the provision of an apparatus which includes an electrode which is expansible to increase the transverse dimension thereof whereby to securely engage the flanges of the core strip and exert an expansive force thereupon, and which is contractible to permit the transverse dimension of the electrode to be reduced.

Another object of my invention is the provision of an apparatus for fabricating core reinforced panel wherein there is included an electrode adapted to support a core element wherein said electrode is provided with expansion means adapted to cause the expansion of the electrode into engagement with the flanges on the core strip to provide for more effective engagement of said flanges with the interior surfaces of the surface sheets.

Other objects and advantages of my invention will be apparent from the following specification and the accompanying drawings which are for the purpose of illustration only and in which:

FIG. 1 is a perspective view showing an apparatus constructed in accordance with the teachings of my invention;

FIG. 2 is an enlarged, fragmentary view showing a portion of the apparatus of my invention;

FIG. 3 is a fragmentary view taken from the broken line 3—3 of FIG. 2;

FIG. 4 is a diagram of the pneumatic circuitry embodied in the apparatus of my invention;

FIG. 5 is a view taken from the broken line 5—5 of FIG. 2.

FIG. 6 is a view similar to FIG. 5 showing the component parts thereof in operative positions;

FIG. 7 is an enlarged, fragmentary, sectional view showing the fabrication of a panel on the apparatus of the invention;

FIG. 8 is a fragmentary view showing the manner in which cooling water is fed to the electrode incorporated in the apparatus of my invention;

FIG. 9 is an enlarged, fragmentary, sectional view of the expansible electrode of my invention;

Figure 10:
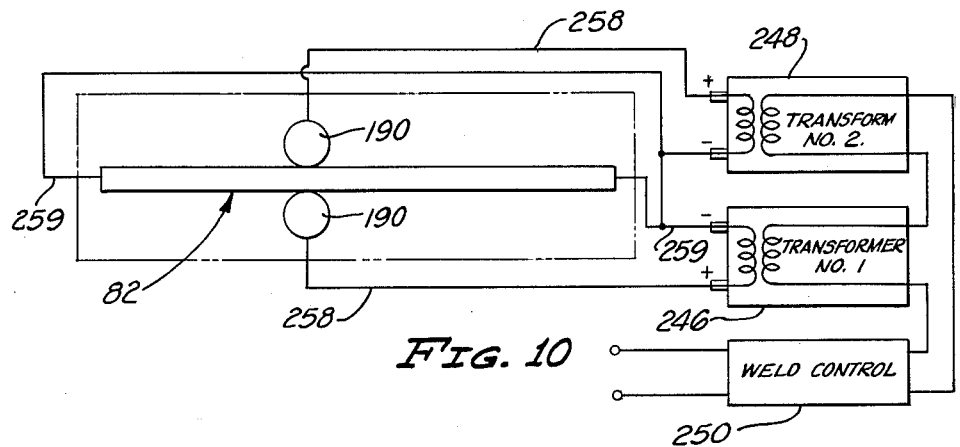
FIG. 10 is a circuit diagram showing the welding circuitry incorporated in the apparatus of my invention.

Referring to the drawings and particularly to FIGS. 1–3 thereof I show a welding apparatus 10 constructed in accordance with the teachings of my invention and including a frame 12; said frame including tubular legs 14 maintained in operative engagement by transversely oriented spreaders 16. Mounted upon the upper extremities of the legs 14 is a bed 18, best shown in FIG. 2 of the drawings, said bed having end plates 20 mounted at the opposite extremities thereof which have vertical standards 22 extending upwardly therefrom whose upper extremities are connected by transversely oriented stiffeners 24 as best shown in FIG. 1 of the drawings.

The bed 18 is provided with a large elongated opening 26 intermediate its extremities for the reception of a honeycomb core reinforced panel 30 being fabricated in the apparatus 10 and consisting of spaced surface sheets 34 maintained in operative relationship with each other by a honeycomb core 36 which, as best shown in FIG. 7 of the drawings, includes a plurality of corrugated or wave-form core strips or elements 42 which incorporate flanges 44 adapted to be disposed in parallelism to the interior surfaces of the surface sheets 34 and which are adapted to have the flanges at the apical portions of the last core strip inserted between the flanges at the basal portions of the previously inserted core strip.

The insertion process may be alternatively described as consisting in the insertion of male nodal area flanges within corresponding female nodal area flanges, as best shown in FIG. 7 of the drawings, and as described and disclosed in my copending application Serial No. 532,605, filed September 6, 1955, entitled "Structural Panel of Honeycomb Type."

Mounted for vertical movement on the standards 22 is a carriage 46, said carriage including sliding blocks 48 encompassing said standards and having diagonals 50 secured therebetween. Operatively connected to the diagonals 50 is a carriage bar 52 having a dielectric insulating bar 54 secured to the underside thereof and incorporating mounting clamps 56 adapted to engage an adapter plate 58 having securement bars 60 adapted to maintain the surface sheets 34 of the panel 30 in spaced relationship with each other.

The carriage 46 thus serves as mounting means for maintaining the surface sheets 34 in spaced relationship and is adapted to move said surface sheets 34 upwardly and downwardly in the opening 26 in the bed 18 for a purpose which will be described in greater detail below.

Secured to the carriage bar 52 intermediate its extremities is the lower end of a piston rod 64 adapted to be extended or retracted from a hydraulic cylinder 66 which is connected to a source 68 of hydraulic fluid through hydraulic lines 72 and 74. A pump 76 supplies hydraulic fluid under pressure to a control valve 78 and the valve 78 determines whether fluid will flow through the line 72 to extend the piston rod 64 or through the line 74 to retract the same.

Therefore, extension of the piston rod 64 from the cylinder 66 will cause the carriage 46 to be lowered with respect to the frame 12, causing lowering of the surface sheets 34 through the opening 26 in the bed 18, for a purpose which will be described in greater detail below. Conversely, retraction of the piston rod 64 into the cylinder 66 will cause upward movement of the carriage 46 and corresponding upward movement of the surface sheets 34. During operation of the device an enclosure 80 serves to conceal the operating mechanism and to prevent the splashing of cooling water utilized to cool the various components of the apparatus 10.

Mounted between the end plates 20 and located over the opening 26 in the bed 18, as best shown in FIGS. 2–4 of the drawings, is an electrode 82, said electrode being constituted by a pair of elongated bars 84 which are secured to each other at their lower edges for expansive outward movement and which have corrugations 86 provided in the upper surfaces thereof, as best shown in FIGS. 4 and 9 of the drawings, adapted to conform to corresponding corrugations in the core strips or elements 42. Mounted on the sides of the bars 84 constituting the electrode 82 are electrode plates 90, said electrode plates being maintained in operative engagement with the electrode bars 84 by means of screws 92, or similar fasteners. Such electrode plates are shown in detail in my copending application for United States Letters Patent filed June 13, 1958, Serial No. 741,802, for "Method and Apparatus for Resistance Welding." The electrode plates are provided with corrugations 96 corresponding to the corrugations provided on the upper surfaces of the electrode bars 84.

One of the electrode bars 84 is, as best shown in FIGS. 2 and 4 of the drawings, provided with an extension 98 secured to indexing means 100 said indexing means being constituted by a pneumatic cylinder 102 having a piston rod 104 connected to the extension 98. The cylinder 102 is connected to a source of air under pressure through lines 106 and 108 which are in turn connected to a control valve 110 interposed in the lines 106 and 108 to control air flow from the air source which is constituted by a manifold line 112 as best shown in FIGS. 1 and 4 of the drawings.

Therefore, when the valve 110 is operated, pressure air can be caused to flow through either the line 106 or 108 to respectively retract or extend the piston rod 104 and to correspondingly index the electrode 82 to the right or to the left as viewed in FIG. 4 of the drawings. A gage 114 is adapted to contact an arm 116 on the extension 98 to indicate the distance through which the electrode 82 is indexed by the action of the indexing means 100. Indexing of the electrode 82 permits the core strips 42 to be longitudinally shifted with respect to each other by one-half of a corrugation or wave length in order that the nodal areas thereof may be juxtaposed to each other in the manner shown in FIG. 7 of the drawings. Obviously if such indexing did not take place the corrugations of the successive core strips or elements 42 would rest one within the other.

Mounted at the left hand extremity of the welding apparatus 10 and located on the end plate 20 thereat is expansion means 120, said expansion means including a pneumatic cylinder 122 and a piston rod 124 projecting therefrom and secured to a wedge shaped mandrel 126. The wedge shaped mandrel 126 is movable in a recess 127 provided in the associated electrode bar 82, as best shown in FIGS. 4 and 5–6 of the drawings, and is associated with a correspondingly shaped wedge shaped mandrel 128 located in a corresponding recess 130 and having its outer extremity secured, as at 132, in the extension 98 on the electrode bar 84. Retainer pins 134 overlie the upper edges of the mandrels 126 and 128 to restrain said mandrels against upward deflection from the corresponding recesses 127 and 130, said retainer pins having their opposite extremities seated, as best shown in FIG. 9 of the drawings, in recesses 136 in the electrode bars 84.

The pneumatic cylinder 122 is connected by lines 138 and 140 to the air manifold 112, air flow control being maintained by a valve 142. Therefore, upon appropriate operation of the valve 142, the piston rod 124 is correspondingly extended from or retracted into the cylinder 122 to respectively cause the movable mandrel 126 to advance into its associated receptacle or recess 127 and to engage the corresponding mandrel 128, thus urging the electrode bars outwardly from the position shown in FIG. 5 of the drawings into the position shown in FIG. 6 of the drawings or to retract the mandrel 128 to permit the electrode bars 84 to move inwardly toward each other.

The electrode 82, in the present embodiment of the apparatus of the invention, is formed in one piece with the bars 84 integrally connected at their lower edges. Therefore, the inherent resilience of the material of which they are formed will cause them to move inwardly toward each other when the wedge shaped mandrel 126 is withdrawn in the above-described manner.

Thus, when a core strip 42 is located at the welding zone 150, with its flanges 44 disposed in overlying relationship with the corresponding electrode plates 90 disposed in the retracted positions, as best shown in FIG. 5 of the drawings, the electrode bars 84 assume the positions shown in FIG. 5. Inward movement of the electrode bars 84 and the corresponding electrode plates 90 obviously facilitates the installation of the respective core strip 42 in overlying relationship with the electrode bar 82.

However, when the pneumatic cylinder 122 has air fed into it through the line 138 by proper operation of the valve 142, the piston rod 124 will be extended from the cylinder 122 and the movable mandrel 126 will be advanced into its associated recess 127 to cause outward displacement of the electrode bars 84 by imposing an expansive force thereupon due to the relative wedging action of the mandrels 126 and 128. Consequently the flanges 44 on the core strip 42 supported on the electrode 82 will be urged outwardly into intimate engagement with the respective interior surfaces of the surface sheets 34 of the panel 30.

As previously indicated in considering the advantages of the apparatus and method of the invention over the prior art, isolation means generally indicated at 152 in FIGS. 2 and 4–6 of the drawings is incorporated in the apparatus 10 to eliminate the possibility of undesirable wrinkling, pleating or similar deformation of the surface sheets 34 of the panel 30. The isolation means 152 includes a pair of isolation bars 154 disposed on opposite sides of the opening 26 and mounted at their extremities on arms 158 which are pivotally secured at their lower ends on pivot pins 160. Interposed between the arms 158 are pneumatic cylinders 162 which are pivotally mounted as at 164 on an associated arm 158 and which have piston rods 166 pivotally secured by pivot pins 168 to oppositely disposed arms 158.

Therefore, when a valve 170 is energized, air under pressure will flow to the cylinders 162 either through a line 172 or 174, as best shown in FIG. 4 of the drawings. For example, if the valve 170 is operated to cause fluid flow through the line 172 the piston rods 166 will be simultaneously extended from the associated cylinders 162 to spread or open the bars 154. Conversely, flow of fluid through the line 174 will cause retraction of the piston rods 166 into the cylinders 162 to cause the isolation bars 154 to impinge upon the adjacent exterior surfaces of the surface sheets 34, as best shown in FIGS. 5 and 6 of the drawings.

The mode of operation of the isolation bars 154 is best illustrated in FIG. 6 of the drawings wherein the bars 154 are shown engaging the isolation zone 180 adjacent the welding zone 150, thus isolating the free portions or remainders of the surface sheets 34 from the welding zone 150. Therefore, the isolation bars 154 serve to exert an external, compressive force on the surface sheets adjacent the welding zone 150 and intermediate the welding zone 150 and the free portions of the surface sheets 34.

A plurality of longitudinally oriented guide and supporting rods 182 is provided on the opposite sides of the welding apparatus 10, the opposite extremities of said rods being mounted in supporting blocks 184. Supported for sliding movement on the guide rods 182 is a welding head means 186 constituted by two welding carriages 188 each of which supports a welding roller 190 engageable with a corresponding surface of the opposed surface sheet 34. Each of the welding rollers 190 is mounted, as best shown in FIGS. 3–4 on a pivoted arm 192 which is adapted to be moved toward or away from the respective surface sheet 34 by a pneumatic cylinder 196 and a piston rod 198 pivotally secured to the arm 192. Inward pressure or force exerted on the welding rollers 190 is controlled by a valve 200 connected to the fluid pressure line 112 and controlling flow of pressure fluid through a line 202, which is in turn connected to the cylinders 196. The cylinders 196 are single acting and release the pressure on the rollers 190 when the flow of pressure fluid in the line 202 is reversed.

An electric motor 208 operating through a gear reducer 210, as best shown in FIG. 2 of the drawings, rotates a drive wheel 212 which is adapted to rotate sprockets 214 on opposite sides and ends of the bed 18 to cause drive chains 216 on each side of the apparatus 10 to longitudinally translate the respective welding carriages 188 and cause corresponding translation of the welding rollers 190 in the welding zone 150. A control 218 serves to energize the motor 208 to cause the longitudinal translation of the welding carriages 188.

Figure 11:
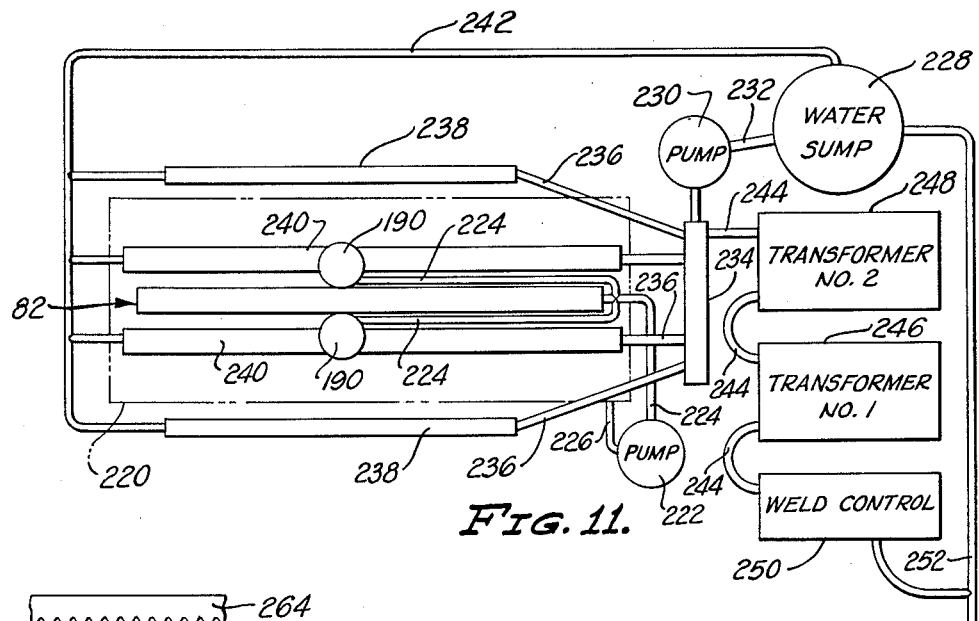
FIG. 11 is a cooling circuit diagram.

During the operation of the apparatus cooling water is fed from a tank 220 by means of a pump 222, as best shown in FIGS. 6 and 11 of the drawings, through lines 224 to the welding rollers 190 to cool the welding zone 150 and said welding rollers. The water flow from the ends of the lines 224 is directed against the welding zone 150 and flows by gravity into the tank 220 whence it is withdrawn by means of the pump 222 through a line 226.

Another cooling circuit, best shown in FIG. 11 of the drawings, is constituted by a sump 228 having a pump 230 connected thereto through a line 232. The output of the pump 230 is directed to a manifold 234 connected through lines 236 to cooling manifolds 238 for the electrode power cables and to cooling manifolds 240 for the electrical power cables for the welding rollers 190. In addition cooling water flows through a return line 242 to the sump 228. Cooling water also flows from the manifold 234 through a line 244 to the welding transformers 236 and 248 and to the welding control 250 and through a return line 252 to the sump 228.

As best shown in FIGS. 5–6 and 8 the cooling line 224 to the electrode bar 82 communicates with a plurality of ports 254 in the electrode bar through which water is fed into a cooling space 256 between the electrode bars 84. The cooling water flows upwardly past the mandrels 126 and 128 through grooves 282 to cool the corrugated surfaces of the electrode 82 and the electrode plates 90 and flows downwardly by gravity into the tank 222.

A circuit diagram of the welding circuit is shown in FIG. 10 of the drawings as including the welding control 250, the first welding transformer 246 and the second welding transformer 248. Like polarities of the secondaries of the welding transformers 246 and 248 are connected to the welding rollers 190 through leads 258 while the opposite polarities thereof are connected through leads 259 to the electrode 82. Thus, during the welding process welding current flows between the individual welding rollers and the electrode 82 and an optimum weldment of the flanges 44 of the core strips 42 will take place.

Figure 12:
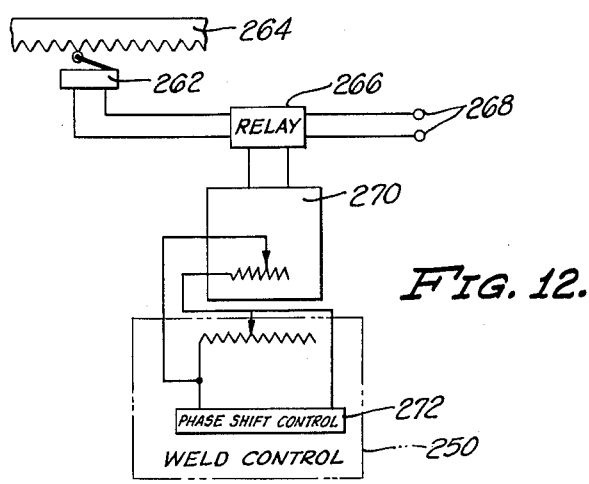
FIG. 12 is a ciruit diagram showing an overriding phase shift control adapted to be incorporated in the welding circuit of the apparatus.

An overriding phase shift control circuit is shown in FIG. 12 of the drawings and includes a normally open switch 262 adapted to be closed at the peaks or apical nodes of a corrugated bar 264, said corrugated bar being arranged, as best shown in FIGS. 2 and 3 of the drawings, with its apical nodes coincident with the apical nodes of the electrode 82 and the electrode plates 90.

The switch is connected to a relay 66 to a source of current through leads 268. Closing of the switch 262 energizes the relay 266 and causes a potentiometer 270 to alter the phase shift circuit 272 of the welding control 250.

Therefore, as the welding rollers 190 traverse the apical areas of the core strips 42 where the flanges 44 are in internested relationship the switch 262 will be closed and the resistance of the potentiometer 270 put in parallel with the phase shift circuit 272 to raise the heat of weld at the nodal overlap where three layers of metal are encountered on each side of the electrode bar 82.

In the operation of the apparatus 10, a pair of surface sheets 34 is suspended in spaced relationship from the securement bars 60 and a core strip 42 is deposited upon the electrode 82 with the electrode bars 84 thereof in the retracted position of FIG. 5. The surface sheets 34 are then lowered into overlying relationship with the electrode 82 by lowering the carriage 46 until the surface sheets 34 are located at the welding zone 150 and the core strips 42 are internested.

When the surface sheets 34 are so located the isolation bars 154 are urged inwardly to lock the portions of the surface sheets 34 intermediate the welding zone 150 and the free lower extremities of the surface sheets 34 against distortion in the isolation zone 180 during the welding process. The mandrel 126 is then advanced to spread the welding bars 84 and apply an expensive force to the flanges 44 of the core strips 42 to urge said flanges into intimate engagement with the interior surfaces of the surface sheets 34.

Therefore, the isolation bars 154 exert a compressive force on the surface sheets 34 in the isolation zone 180 which is adjacent the welding zone 150. At the same time the mandrels 126 and 128 exert an expensive force which is impressed upon the flanges 44 of the core strips 42 in the general area of the welding zone 150.

The expansive force exerted by the electrode bars 84 insures optimum physical contact of the flanges 44 with the surface sheets and with corresponding flanges of adjacent core strips 42 and prevents deformation of core strips. The isolation bars 154 restrain the surface sheets against deformation and permitting a panel 30 having a smooth surface to be fabricated. As pointed out hereinabove, the imposition of a compressive force on the outer surfaces of the surface sheets by the isolation bars 154 adjacent the welding zone during the welding step isolates said welding zone from the remaining free portions of the surface sheets in order that a transitional area be established wherein the shrinkage of the panel during the welding process is controlled within acceptable limits and the characteristic pleating of the panel surface resulting from the practice of prior art methods is avoided.

After the respective expansive and compressive forces have been applied in the above-described manner the welding rollers 190 are urged into contact with the surfaces of the sheets 34 at the welding zone 150 and are traversed across said sheets to weld the flanges 44 of the core strips 42 to the surface sheets 34 and to each other. After weldment has been accomplished the welding rollers 190 are withdrawn, the isolation bars 154 are retracted and the electrode bars 84 are withdrawn to permit the panel 30 to be raised on the carriage 46.

The electrode 82 is then indexed by the energization of the indexing cylinder 100 to shift the electrode 82 one-half wave length or corrugation and a new core strip 42 is placed thereupon. The carriage 46 is then lowered until the new core strip flanges interengage the flanges 44 on the last welded core strip 42. The isolation bars 154 are then urged inwardly while the electrode bars 84 are urged outwardly and the welding process is repeated.

In this manner and, by the use of the method and apparatus of my invention, a panel characterized by uniformity of weldment and physical surface is achieved. In addition the entire panel 30 together with the core structure 40 thereof can be fabricated simultaneously.

I claim:
1. In a method of fabricating a honeycomb core reinforced structural panel, the steps of: supporting a pair of electrically conductive surface sheets in spaced relationship with each other; placing an electrically conductive honeycomb core element on a supporting electrode; causing relative movement between the surface sheets and the electrode to locate the honeycomb core element at a lineal welding zone between said surface sheets; engaging the outer surfaces of said surface sheets by isolation bar means to create an isolation zone on said surface sheets at one side only of said welding zone; and impressing a welding potential across a welding head means disposed in contact with the external surfaces of said sheets in the region of said electrode and said core element to secure said core element and said surface sheets to one another.

2. In a method of fabricating a honeycomb core reinforced panel, the steps of: disposing a pair of electrically conductive surface sheets in spaced relationship; placing an electrically conductive core element in the space between said sheets at a welding zone defined by the engagement of the interior surfaces of said sheets with the opposite edges of said core element; applying an isolating force to the opposite surfaces of the surface sheets adjacent at one side only of said welding zone; and traversing a welding head across said welding zone to accomplish the securement of said opposite edges to interior surfaces of said sheets.

3. In a method of fabricating honeycomb core reinforced panel, the steps of: disposing a plurality of electrically conductive surface sheets in spaced relationship with each other; locating an electrically conductive core element in the space between said sheets at a welding zone; locating an electrode for supporting said core element at said welding zone; applying an isolating force on the outer surfaces of said sheets intermediate only said welding zone and the remainder of said sheets; impressing a welding current on the outer surfaces of said sheets in said welding zone while maintaining said isolating force upon said sheets to permit limited shrinkage of said sheets while securing said core element and said sheets to each other and imposing a lineal compressive force on said surface sheets at a point spaced from and at one side only of said electrode to permit limited shrinkage of said surface sheets while said welding potential is impressed across said sheets.

4. In a method for fabricating a reinforced structural panel, the steps of: maintaining a pair of electrically conductive surface sheets in spaced relationship with each other; placing an electrically conductive core element having flanges on its opposite edges on an expansible electrode with said flanges overlying the sides of said electrode; locating said electrode at a welding zone with the flanges of said core element disposed in contiguity to the inner surfaces of said sheets; expanding said electrode by wedging action to force said flanges against the interior surfaces of said sheets; impressing a welding potential across said sheets and said core element to secure said flanges to said sheets, and imposing a lineal compressive force on said surface sheets at a point spaced from and at one side only of said electrode to permit limited shrinkage of said surface sheets while said welding potential is impressed across said sheets.

5. In a method for fabricating a reinforced structural panel, the steps of: maintaining a pair of electrically conductive surface sheets in spaced relationship with each other; placing an electrically conductive core element having flanges at its opposite edges on an expansible electrode with said flanges overlying the sides of said electrode; locating said electrode at a welding zone with the flanges of said core element disposed in contiguity to the inner surfaces of said sheets; imposing a linear isolating force on the exterior surfaces of said sheets intermediate said welding zone and the remaining portions of said sheets and only at one side of said zone; expanding said electrode to force said flanges against the interior surfaces of said sheets; and impressing a welding potential across said sheets and said core element to secure said flanges to said sheets.

6. In a method of fabricating a structural panel, the steps of: placing a pair of electrically conductive surface sheets, in spaced, substantially parallel relationship with each other; supporting an electrically conductive core element having flanges at its opposite edges between said sheets at a linear welding zone; applying an external linear compressive force to said sheets only at one side of said welding zone intermediate said welding zone and the remainders of said sheets; applying an internal expansive force to the flanges of said core element; and impressing a welding potential across said sheets and said core element to secure said sheets and core element to one another.

7. In a method of securing a wave-form, electrically conductive core element to correspondingly conductive surface sheets, the steps of: placing said sheets in spaced relationship with each other; disposing said core element in the space between said sheets with its opposite edges in contiguity to the interior surfaces of said sheets at a linear welding zone; exerting an external, compressive force upon said sheets in a linear zone at one side only of said welding zone; and impressing a welding potential upon said sheets to permit limited shrinkage of said surface sheets in a uniform manner while securing said sheets and said core element to one another.

8. In a method of securing a wave form core element of electrically conductive material to correspondingly conductive surface sheets, where said core element has flanges at its opposite edges, the steps of: placing said sheets in spaced, parallel relationship; locating said core element in the space between said sheets at a linear welding zone with its flanges in contiguity to the inner surfaces of said sheets; applying a compressive force to the outer surfaces of said sheets in a linear zone adjacent the welding zone and at one side only of said welding zone to isolate said welding zone from the remaining portions of said sheets; subjecting said flanges to an expansive force to urge them against the inner surfaces of said sheets; and impressing a welding potential across said sheets and said core element to secure them to one another.

9. In an apparatus for fabricating structural panels, the combination of: a supporting framework; mounting means on said framework for maintaining a pair of electrically conductive surface sheets in spaced relationship with each other; an elongated electrode on said framework adapted to support a core element and flanges thereupon at a welding linear zone between said sheets; means for applying an isolating force to the exterior surfaces of said sheets at a zone at one side only of said welding zone; and a welding head mounted for longitudinal movement on said framework for traversing said surface sheets to secure said core element to said surface sheets.

10. In an apparatus for fabricating structural panels, the combination of: a supporting framework; mounting means on said framework for maintaining a pair of electrically conductive surface sheets in spaced relationship with each other; a two-part electrode on said framework adapted to support a core element having flanges thereupon at a welding zone between said sheets; an expansible wedge between the two parts of said electrode to expand the flanges of said core element into engagement with the inner surfaces of said sheets; means for applying an isolating force to the exterior surfaces of said sheets at a zone adjacent said welding zone; and a welding head mounted for longitudinal movement on said framework for traversing said surface sheets to secure said core element to said surface sheets.

11. In a welding machine, the combination of: mounting means for maintaining a pair of electrically conductive surface sheets in spaced relationship with each other; supporting means constituted by a two-part electrode for supporting a core element between said sheets at a welding zone, said core element having flanges on its opposite edges contiguous to the interior surfaces of said sheets; means for applying a compressive force to the exterior surfaces of said sheets adjacent said welding zone; wedge means for applying an expansive force to said two-part electrode and to said flanges to urge them into contiguity with the interior surfaces of said sheets; and a welding head adapted to be traversed across said sheets to secure said flanges to said sheets.

12. In an apparatus for fabricating honeycomb core reinforced panel the combination of: a frame; means on said frame for mounting a pair of electrically conductive sheets in spaced relationship with each other; an expansible electrode mounted on said frame and adapted to support a core strip in the space between said sheets at a welding zone; means on said frame for expanding said electrode; a welding head on said frame for traversing said surface sheets to weld said core strip and said surface sheets to one another; and a pair of elongated isolation bars located at one side only of said welding zone and movable into engagement with the opposite surfaces of said surface sheets to isolate said welding zone from the remaining portions of said sheets.

13. In an apparatus for welding a composite panel consisting of a honeycomb core having surface sheets secured to the opposite sides of said core, the combination of: a frame; mounting means on said frame for maintaining a pair of surface sheets in spaced relationship with each other; an expansible electrode mounted on said frame for supporting a flanged core strip in the space between said sheets at a welding zone, said electrode including expansible members engageable with said flanges and expansion means movable between said members to expand the same; a welding head translatable across said welding zone to secure said flanges and said surface sheets to one another; and a pair of isolation bars mounted for movement in said frame in a direction transversely of the direction of movement of said welding head to engage said surface sheets adjacent and at one side only said welding zone to isolate the remaining portions of said surface sheets from said welding zone, and permit limited shrinkage of said surface sheets during the welding operation.

References Cited in the file of this patent

UNITED STATES PATENTS

| | | |
|---|---|---|
| 1,085,769 | Thomson | Feb. 3, 1914 |
| 2,024,239 | McBain | Dec. 17, 1935 |
| 2,106,987 | Powell | Feb. 1, 1938 |
| 2,163,590 | Ganahl | June 27, 1939 |
| 2,596,453 | Weidel | May 13, 1952 |
| 2,820,882 | Johnson | Jan. 21, 1958 |
| 2,930,882 | Campbell | Mar. 29, 1960 |